United States Patent [19]

Colin de Verdiere et al.

[11] Patent Number: 4,578,544

[45] Date of Patent: Mar. 25, 1986

[54] INITIALIZATION DEVICE FOR ECHO CANCELLING DEVICE AND APPLICATION THEREOF TO REMOTE ECHOS

[75] Inventors: Jean-Marc M. Colin de Verdiere, Paris; Patrice R. Langlois, Saint Maur, both of France

[73] Assignee: Societe Anonyme de Telecommunications, Paris, France

[21] Appl. No.: 447,242

[22] Filed: Dec. 6, 1982

[30] Foreign Application Priority Data

Dec. 9, 1981 [FR] France ................ 81 22984

[51] Int. Cl.⁴ .............................................. H04B 3/20
[52] U.S. Cl. .................................................. 179/170.2
[58] Field of Search ............... 179/170.2, 170.4, 170.6, 179/170.8; 370/32

[56] References Cited

U.S. PATENT DOCUMENTS

| 3,735,055 | 5/1973 | Thomas | 179/170.2 |
| 4,162,378 | 7/1979 | Baudox et al. | 179/170.2 |
| 4,349,889 | 9/1982 | van den Elzen et al. | 364/724 |
| 4,355,214 | 10/1982 | Lévy et al. | 179/170.2 |
| 4,425,483 | 1/1984 | Lee et al. | 179/170.2 |

Primary Examiner—Gene Z. Rubinson
Assistant Examiner—R. Vaas
Attorney, Agent, or Firm—Holman & Stern

[57] ABSTRACT

The present invention relates to echo cancelling techniques and more particularly to an initialization device for an echo cancelling system. The invention comprises means for converting a pseudo-random sequence ($u_k$) of length N into a sequence of emitted samples ($e_k$) such that each sample $e_k$ is derived from $u_k$ by $e_k = 2 u_k - 1$, multiplying each sample $u_{(N-M+1+k) \bmod N}$ with each received sample $s_{N+k}$ and adding the results k varying between 0 and $N-1$. The result at instant kT, to within a multiplicative constant, of said additions is then $H_M(k)$, one of the N coefficients at the initial conditions of said echo cancelling device, M being between 0 and N, and k varying from 0 to $N-1$, with $H_M(k) = H_M(k-1) + s_{N+k} \cdot u_{(N+k+1-M) \bmod N}$. The invention is applicable to the pulse response of any signal.

2 Claims, 4 Drawing Figures fig_2 fig_3

INITIALIZATION DEVICE FOR ECHO CANCELLING DEVICE AND APPLICATION THEREOF TO REMOTE ECHOS

BACKGROUND OF THE INVENTION

The present invention relates to simultaneous two-way data transmission on transmission channels, and more particularly to the echo cancellation technique.

Echo cancelling devices provide an estimate of the echo and subtract it from the perturbated signal.

This estimate of the echo signal is usually made at the instants of sampling by adjusting the coefficients $C_k$ of the echo cancelling device. This adjustment is usually made by the gradient algorithm. Such a technique has been described for example in the article by Muller in IEEE Transactions on Communications, Vol. 24, No. 9, Sept. 76, pages 956-962.

Adjustments employing the gradient algorithm are simple to carry out but the convergence of the echo cancelling device using this process is not very rapid.

It is an object of the present invention to improve the rapidity of the convergence of the echo cancelling devices depending on the types of exploitation used, by employing an initialization device. Moreover, the initialization device according to the invention enables the remote echo to be located and is independent of the algorithm employed.

The initialization device according to the invention allows an initialization of any echo cancelling device according to a procedure such that each modem successively emits, and initializes its own echo cancelling device in the absence of a signal coming from the remote end. According to such a procedure, each modem emits an appropriate sequence enabling it to cancel its echo, the remote modem not emitting.

SUMMARY OF THE INVENTION

The initialization device for an echo cancelling device according to the invention comprises means for forming N coefficients for the initial conditions in the cancelling device. These means comprise essentially means for converting a pseudo-random sequence $u_k$ of length N into a sequence of samples $e_k$ such that each sample $e_k$ is derived from $u_k$ by $e_k = 2 u_k - 1$, means for emitting said $e_k$ on-line, means for receiving samples $s_{N+k}$ at reception, means for multiplying each sample $s_{N+k}$ received with N samples $u_{(N-M+1+k)}$ mod N issuing from the cell A'(M) of a shift register, said $u_{(N-M+1+k)}$ being derived from $e_{N-M+1+k}$ by inverse conversion, i.e. $u_k = (e_k + 1)/2$, and means for adding said N results of multiplication, for all the k's, when k varies from 0 to N−1, the result of said addition being $H_M$, one of the N coefficients at the initial conditions, M varying from 1 to N.

The device of the invention also makes it possible to form two sequences of samples $a_k$ and $b_k$ from the pseudo-random sequence $u_k$ of length N, said sequences being such that each sample $a_k$ and $b_k$ is derived from $u_k$ by $a_k = 2 u_k - 1$ and $b_k = 2 u_k - 1$. The samples $a_k$ and $b_k$ are then modulated and emitted on-line and samples $s_{N+k}$ received on-line make it possible to derive therefrom after demodulation samples $\alpha_k$ and $\beta_k$. The device of the invention comprises means for multiplying each sample $(\alpha_{N+k} + \beta_{N+k})$ and $(\beta_{N+k} - \alpha_{N+k})$ received with N samples $u_{(N-M+1+k)}$ mod N issuing from the cell A'P (M) and A'Q (M) of a shift register, said $u_{(N-M+1+k)}$ being derived from $e_{N-M+1+k}$ by inverse conversion, means for adding said results of multiplication for all the k's, when k varies from 0 to N−1, the result of said addition being $F_p$ (M) and $F_q$ (M) two of the 2N coefficients at the initial conditions of said cancelling device, M varying from 1 to N.

According to a feature, the device according to the invention is applied to an echo cancelling device operating in baseband.

According to another feature, the length N of the pseudo-random sequence is chosen to be greater than or equal to the length L of the pulse response of the echo.

According to a further feature, the initialization device makes it possible to recognize the zero samples of the pulse response of the echo and to neglect in the echo cancelling device to update the zero samples.

The initialization device according to the invention gives to the echo cancelling device a considerably rapid and reliable convergence. Moreover, the initialization sequence does not need to be standardized, it is left to the constructor to choose as a function of his needs.

The initialization device of the invention allows the echo cancelling device to be considerably versatile in operation, it being possible in particular to correct the much delayed echoes, for example on transcontinental satellite circuits or on under-water cables, and the echoes, for the person who is speaking, affected by frequency drift.

The invention will be more readily understood on reading the following description with reference to the accompanying drawings.

DETAILED DESCRIPTION OF PREFERRED EMBODIMENTS OF THE INVENTION

Figure 1:
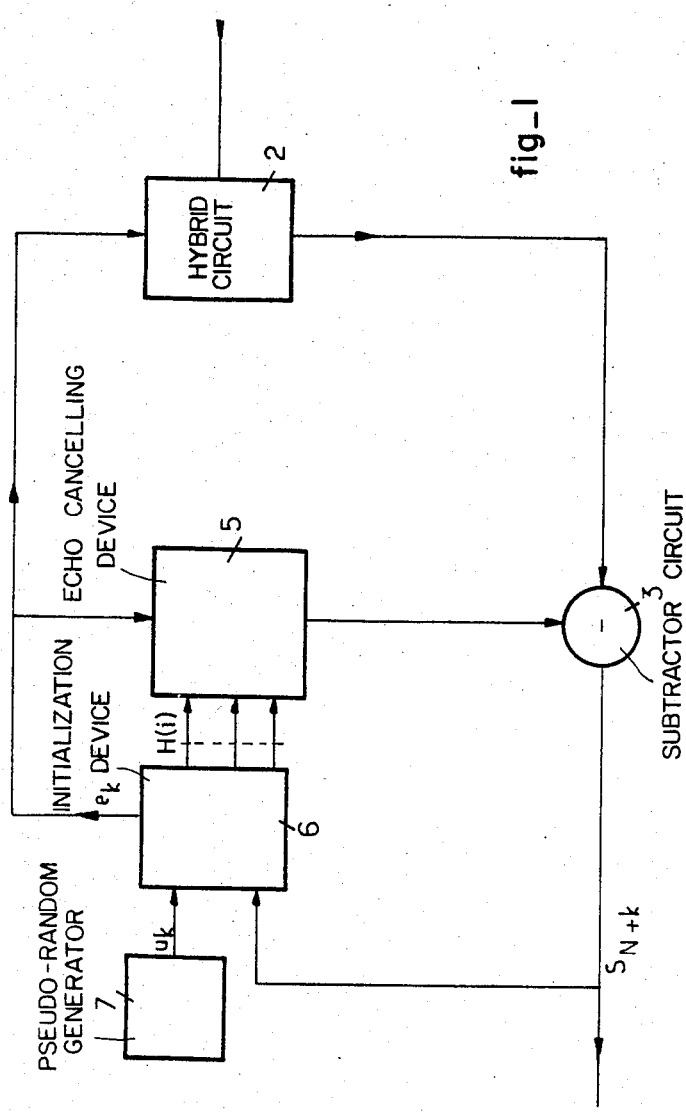
FIG. 1 is a general representation of the insertion of an initialization device according to the invention for echo cancellation in the case of baseband transmission.

Referring now to the drawings, and firstly to FIG. 1, an echo cancelling device 5 known per se makes an estimate of the echo from the incoming signal in the case of baseband transmission. This incoming signal is in the form of a sequence of complex data.

The estimate of the echo, in a cancelling device, is subtracted from the signal received, due to subtraction means 3.

The known echo cancelling device 5 are formed for example by a coefficient updating system, using a gradient algorithm.

A hybrid circuit 2 ensures coupling of the line with emission and reception of the modem, i.e., the echo cancelling device is connected in shunt with an echo path between an emission line and a reception line. See claim 7.

As the gradient algorithm does not converge very quickly, initialization of the echo cancellation system may be fairly long.

The invention consists essentially of inserting a so-called initialization device 6 receiving at input the initialization sequence signal $u_n$ as well as the estimated reception signal $s_n$. It is well known that the modems use initialization sequences, after on-line connection. These sequences are usually pseudo-random messages.

The properties of the pseudo-random sequences are well known. The article by Williams and Sloane published in Proceedings of the IEEE, Vol. 64, No. 12, December 1976, pages 1715 to 1727, studies their particularities. Let $u_k$ be the sequence of the samples of an initialization sequence formed with the aid of a pseudo-random generator 7. The message may be composed of $(N+1)/2$ "zeros" and of $(N-1)/2$ "ones".

According to FIG. 1, the pseudo-random generator 7 furnishes the message $u_k$ at the input of the initialization device 6. At reception, the message is applied to the input of the initialization device 6, which furnishes at the output coefficients directly used by the actual echo cancelling device as initial coefficients $C_k^o$.

Figure 2:
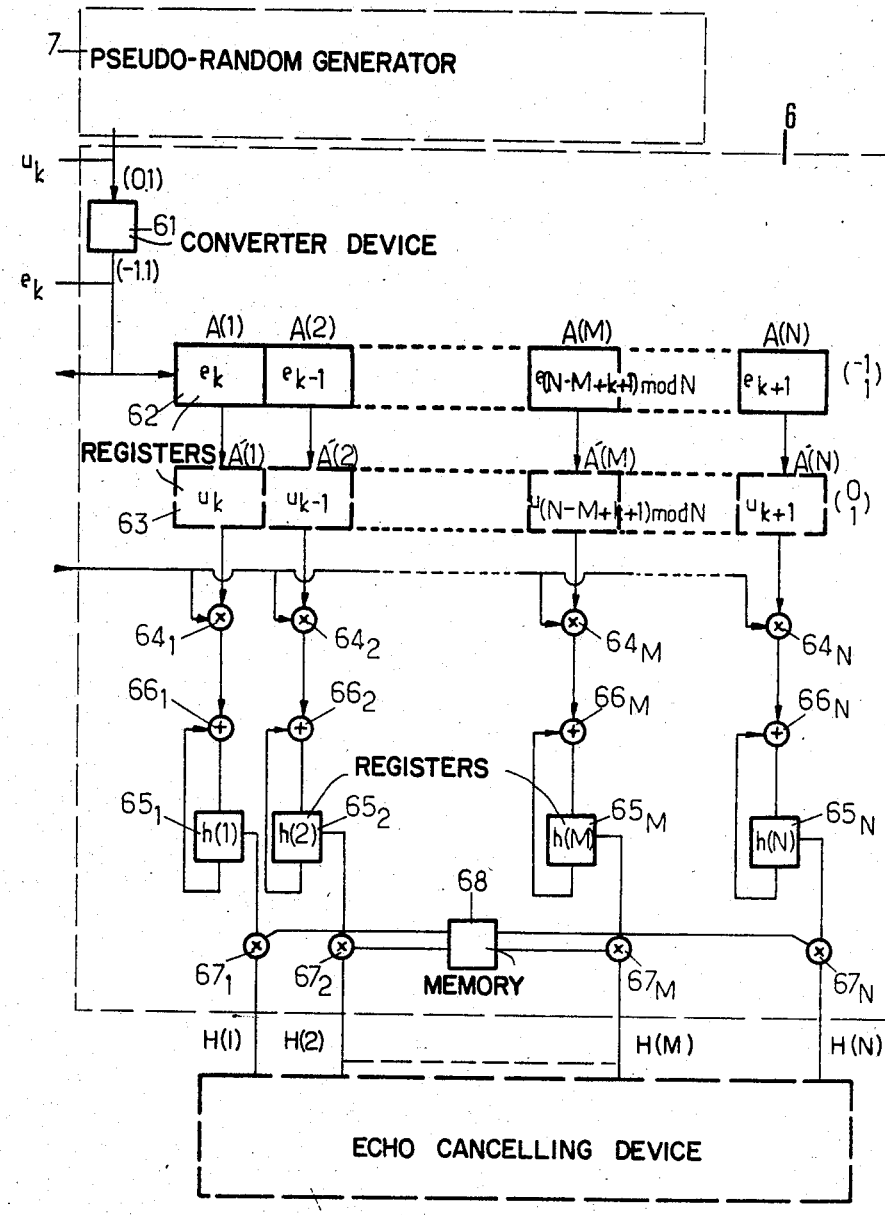
FIG. 2 shows in detail the actual initialization device of FIG. 1.

Referring to FIG. 2, the message $u_k$ is formed by a generator 7. The samples constituting the sequence $u_k$ are pseudo-random of period equal to N.

This message $u_k$ is applied to the input of the actual initialization device 6.

The message $u_k$ is converted according to the invention into a message $e_k$ formed by samples (a, $-a$) by means of a device 61 (first converting means). Each sample $e_k$ is derived from the incoming sample $u_k$ by the relation $e_k = a(2u_k - 1)$. See claim 7.

In practice, a is advantageously chosen to be equal to 1.

The message $e_k$ is on the one hand emitted in-line, on the other hand applied to the input of a shift register 62 constituted by N cells A (1), A (2) ... A (N) each introducing a delay T. Thus, cells A (1) contains $e_k$, cell A (2) contains $e_{k-1}$, cell A (M) contains $e_{(N-M+k+1)}$ modulo N and finally register A (N) contains $e_{k+1}$. These N samples are then applied in parallel to the input of a register 63 also formed by N cells A' (1) ... A' (M) ... A' (N). These N cells A' (M) form from the sample $e_{N-M+k+1}$, samples $u_{N-M+k+1}$ at their output (second converting means).

Thus, cell A' (1) receives $e_k$ and furnishes the sample $u_k$ at the output, cell A' (N) receives $e_{k+1}$ and furnishes $u_{k+1}$ at the output.

Cell A' (M) generally receives sample $e_{(N-M+k+1) \mod N}$ and furnishes at the output sample $u_{(N-M+k+1) \mod N}$. These N samples $u_k \ldots u_{(N+M+k-1)} \ldots u_{k+1}$ are applied to the input of N multiplication circuits (multipliers) $(64_i)_{(i=1 \ldots N)}$. Thus each sample $u_{N-M+k+1}$ is multiplied with the sample $s_{N+k}$ received on the transmission line (reception line) at the output of the subtraction circuit 3 (cf. FIG. 1). The N results $[s_{N+k} \cdot u_{N-i+k+1}]_{(i=1,N)}$ issuing from the N circuits $64_i$ (i=1,N) are respectively applied to the input of N registers $65_i$, which have been initialized to zero, via N addition circuits $(66)_i$. In fact, the operations of multiplication (due to the N multiplication circuits $64_i$) and of addition (due to the N addition circuits $66_i$) begin only at instant NT, i.e. from the arrival of sample $s_N$, generally, to the arrival of the samples $s_{N+k}$, k varying from 0 to $N-1$.

The N addition circuits $66_i$ make it possible to accumulate at instant $(N+k)T$ in question, the contents of the N registers $63_i$.

Thus, the respective contents of the N registers $65_i$ at instant $(N+k)T$ are samples $h_k(i)$ where:

$$h_k(i) = h_{k-1}(i) + s_{N+k} \cdot [\text{contents of } A'(i)] \quad \text{(i)}$$

or $$h_k(i) = h_{k-1}(i) + s_{N+k} \cdot u_{(N+k+1-i) \mod N} \quad \text{(ii)}$$

Then at instant $(N+k+1)T$, the contents of register A(i) is $u_{(k-i+2) \mod N}$ and the sample received is $s_{N+k+1}$, then the following calculation is made and applied in register $65_i$.

$$h_{k+1}(i) = h_k(i) + s_{N+k-1} \cdot u_{(k-j+2) \mod N} \quad \text{(iii)}$$

and the same applies to the N registers $(65_i)_{(i=1,N)}$. A memory 68 containing the constant $2/a(N+1)$ makes it possible to multiply each sample h(i) of each register $65_i$, due to the N multiplication circuits $(67_i)_{(i=1,N)}$.

The N coefficients H (i)$_{(i=1,N)}$ issuing from the N multiplication circuits $(67_i)_{(i=1,N)}$ are the values of the samples of the pulse response of the echo; they are applied to the input of the echo cancelling device 5 and serve as initial coefficients.

If $H_j$ are the samples of the pulse response of the echo, the signal received in steady state is:

$$\begin{bmatrix} s_N \\ s_{N+1} \\ \cdot \\ \cdot \\ s_{N+k} \\ \cdot \\ \cdot \\ s_{2N-2} \\ s_{2N-1} \end{bmatrix} =$$

$$\begin{bmatrix} e_N & e_{N-1} & \cdots & e_{N-j+1} & \cdots & \cdots & e_2 & e_1 \\ e_1 & e_N & \cdots & e_{N-j+2} & \cdots & \cdots & e_3 & e_2 \\ \cdot & \cdot & & \cdot & & & \cdot & \cdot \\ \cdot & \cdot & & \cdot & & & \cdot & \cdot \\ e_k & e_{k-1} & \cdots & e_{(N-j+1+k) \mod N} & \cdots & e_{k+2} & e_{k+2} \\ \cdot & \cdot & & \cdot & & & \cdot & \cdot \\ \cdot & \cdot & & \cdot & & & \cdot & \cdot \\ e_{N-2} & e_{N-3} & \cdots & e_{N-j-1} & \cdots & \cdots & e_N & e_{N-1} \\ e_{N-1} & e_{N-2} & \cdots & e_{N-j} & \cdots & \cdots & e_1 & e_N \end{bmatrix} \begin{bmatrix} H_1 \\ H_2 \\ \cdot \\ \cdot \\ H_j \\ \cdot \\ \cdot \\ H_{N-1} \\ H_N \end{bmatrix}$$

The values of the samples $H_j$ are given by:

$$\begin{bmatrix} H_1 \\ H_2 \\ \cdot \\ \cdot \\ H_j \\ \cdot \\ \cdot \\ H_N \end{bmatrix} = \frac{2}{a(N+1)}$$

$$\begin{bmatrix} u_N & u_1 & \cdots & u_k & \cdots & \cdots & u_{N-1} \\ u_{N-1} & u_N & \cdots & u_{k-1} & \cdots & \cdots & u_{N-2} \\ \cdot & \cdot & & \cdot & & & \cdot \\ \cdot & \cdot & & \cdot & & & \cdot \\ u_{N-j+1} & u_{N-j+2} & u_{(N-j+1+k) \mod N} & & & u_{N-j} \\ \cdot & \cdot & & \cdot & & & \cdot \\ \cdot & \cdot & & \cdot & & & \cdot \\ u_1 & u_N & & u_{k+1} & & & u_N \end{bmatrix} \begin{bmatrix} s_N \\ s_{N+1} \\ \cdot \\ \cdot \\ s_{N+k} \\ \cdot \\ \cdot \\ s_{2N-1} \end{bmatrix}$$

The process of deriving $U_{(N-M+1+k)}$ from $e_{(N-M+1+k)}$ as described above may generally be called inverse conversion.

Figure 3:
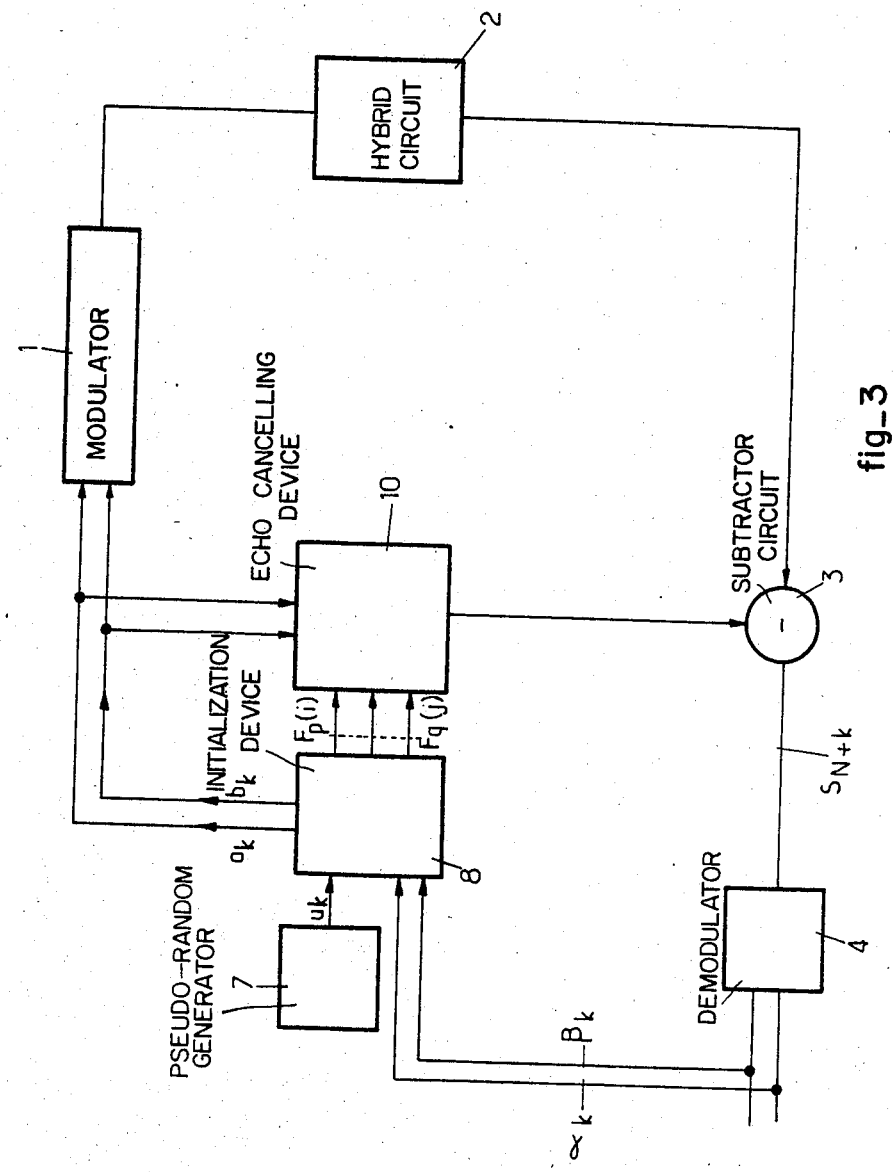
FIG. 3 shows an initialization device according to the invention with modulation for echo cancellation in baseband.

Referring now to FIG. 3, the echo cancellation initialization system according to the invention may also be adapted to a modulated system, the cancellation device further operating in baseband. The echo cancellation device 10 receives, in the same way as in FIG. 1, coefficients $F_p(i)$, $F_q(j)$ furnished by an initialization device.

The initialization device 8 itself receives a pseudo-random message $u_k$ furnished by the generator 7. As will be explained with the aid of FIG. 4, the initialization device 8 converts the message $u_k$ into two messages $a_k$ and $b_k$ which are each emitted on-line. These messages $a_k$ and $b_k$ are on the one hand applied to the input of the cancelling device 10, on the other hand to the input of a modulator 1. The echo cancelling device 10 makes, in manner known per se, an estimate of the echo from samples $a_k$ and $b_k$ before modulation by modulator 1. This estimate is modulated then substracted from the signal received, before a complex coherent demodulation by a demodulator 4, due to the subtraction means 3. A differential circuit 2 ensures coupling of the line with emission and reception of the modem i.e., the echo cancelling device is connected in shunt with an echo path between a modulator and a reception line. The samples $\alpha_{n+k}$ and $\beta_{N+k}$ obtained at the output of the demodulator 4 on two channels are applied to the input of the initialization device 8. See claim 8.

Figure 4:
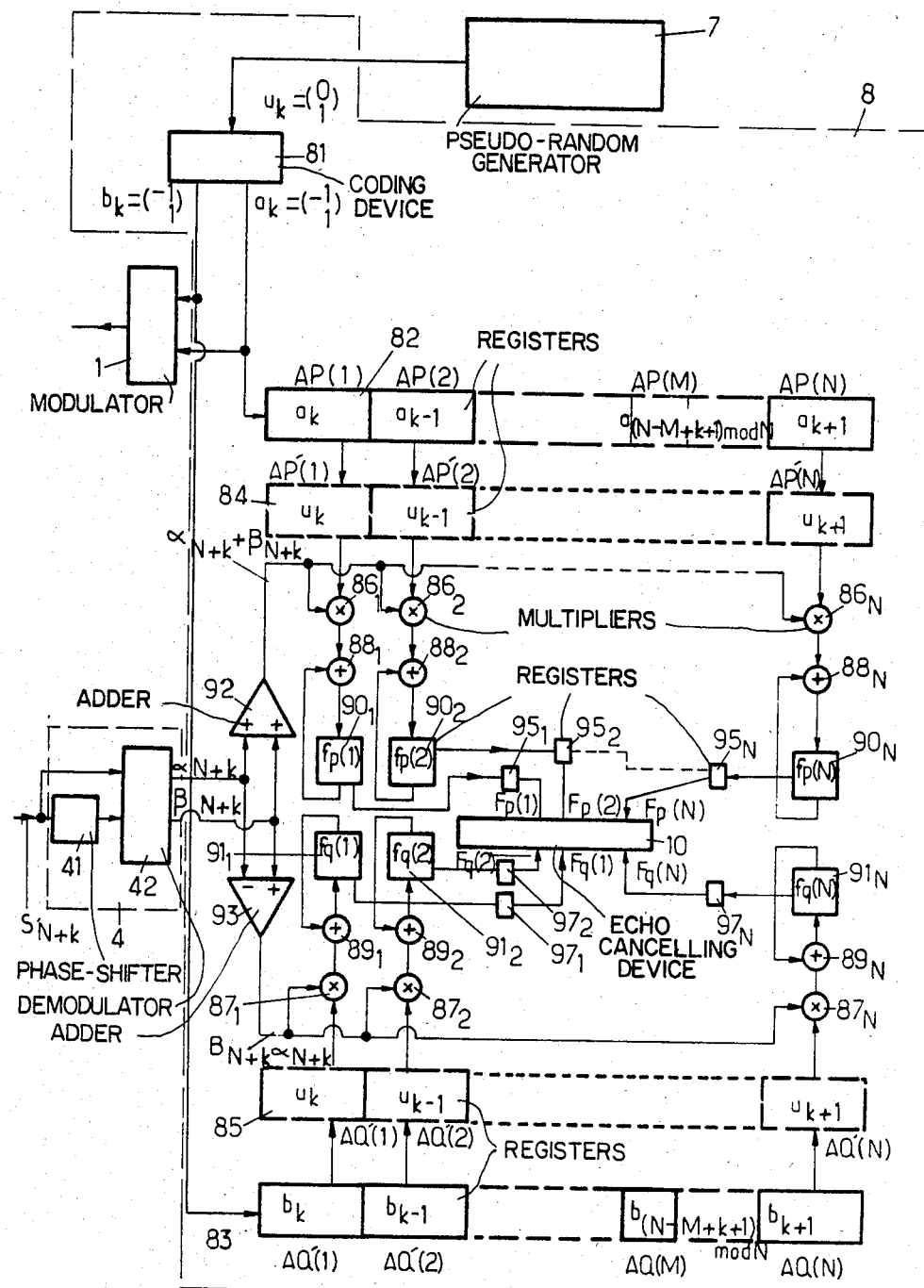
FIG. 4 shows the initialization device of FIG. 3, in detail.

FIG. 4 explains the structure and operation of the initialization device 8 according to the invention. See claim 8. A coding device (first converting means) 81 receives the pseudo-random message $u_k$ generated by generator 7, as for the embodiment of FIG. 2. However, the device 81 codes this message $u_k$ on two channels in a manner known per se. Let $a_k$ and $b_k$ be the messages thus formed. Each sample $a_k$ or $b_k$ issuing from the coding system 81 is derived from the incoming sample $u_k$ by the relation $a_k = (2 u_k - 1)$ so that the $a_n$ and $b_n$ are formed by ±1.

In practice, $a_k$ and $b_k$ are chosen to be equal. Each of the two messages (initialization device first outputs) is on the one hand emitted on-line (to the emission line) after a complex coherent modulation by means of the modulator 1 and on the other hand applied to the input of shift registers 82 (first shift register) and 83 (second shift register). The message $a_k$ for example is applied to the input of the register (first shift register) 82 formed by N cells $AP(1) \ldots AP(M) \ldots AP(N)$ each shifting the incoming sample by a time T whilst the message $b_k$ is applied to the (second shift register) input of the register 83 also formed by N cells $AQ(1) \ldots AQ(M) \ldots AQ(N)$ each delaying the incoming sample by a time T. The samples $a_k, a_{k-1} \ldots a_{N-M+k+1} \ldots a_{k+1}$ coming respectively from cells AP(1) to AP(N) are respectively applied to the input of N cells $AP'(1) \ldots AP'(M) \ldots AP'(N)$ of a shift register (second converting means) 84. In the same way, samples $b_k, b_{k-1} \ldots b_{N-M+k+1} \ldots b_{k+1}$ coming respectively from cells AQ(1) to AQ(N) are respectively applied to the input of N cells $AQ'(N) \ldots AQ'(M) \ldots AQ'(N)$ of a shift register (third converting means) 85. The registers (second and third converting means) 84 and 85 furnish at the output, in parallel, samples $u_k, u_{k-1} \ldots u_{(N-M+k+1) mod N} \ldots u_{k+1}$ at the input of 2N multiplication circuits (first multipliers) $(86_i)_{(i=1,N)}$ and (second multipliers) $(87_j)_{(j=1,N)}$.

These multiplication circuits (first and second multipliers) $(86_i)_{(i=1,N)}$ and $(87_j)_{(j=1,N)}$ also respectively receive the samples $(\alpha_{N+k} + \beta_{N+k})$, coming from addition circuit (first adder) 92, and $(\beta_{N+k} - \alpha_{N+k})$ coming from addition circuit (second adder) 93. The signal $\alpha_{N+k}$ and the signal $\beta_{N+k}$ are obtained from the signal $s'_{N+k}$ obtained at the output of the subtraction circuit 3 by complex coherent demodulation. To this end, the demodulator 4 is composed of a phase-shift circuit 41 (by $\pi/2$) and of a demodulator 42 proper which furnishes the two channels in quadrature $\alpha_{N+k}$ and $\beta_{N+k}$. These messages $\alpha_{N+k}$ and $\beta_{N+k}$ are therefore applied to the input of the first adder and second adder circuits 92 and 93.

The 2N multiplication circuits, first multipliers $(86_i)_{(i=1,N)}$ and second multipliers $(87_j)_{(j=1,N)}$ respectively thus make it possible to multiply the signals $(\alpha_{N+k} + \beta_{N+k})$ and $(\beta_{N+k} - \alpha_{N+k})$ respectively coming from first and second adder circuits 92 and 93 with the contents of the i th cell and j th cell of the register 84 (second converting means) and 85 (third converting means) respectively.

The result of the 2N multiplications of the $(86_i)_{(i=1,N)}$ and $(87_j)_{(j=1,N)}$ is respectively applied in 2N registers $(90_i)_{(i=1,N)}$ and $(91_j)_{(j=1,N)}$ via 2 N addition circuits $(88_i)_{(i=1,N)}$ and $(89_j)_{(j=1,N)}$. In the same way as for the embodiment of FIG. 2, the 2N circuits $88_i$ and $89_j$ make it possible to accumulate, at instant (N+k)T in question, the contents of the two registers 84 and 85.

The 2N registers $(90_i)_{(i=1,N)}$ and $(91_j)_{(j=1,N)}$ have been initialized to zero. The respective contents of registers $(90_i)_{(i=1,N)}$, at instant (N+k)T, are samples $(f_p(i)$ such that $$f_p(i) = f_p(i) + (\alpha_{N+k} + \beta_{n+k}) \cdot [\text{contents of } AP'(i)]$$

or $$f_p(i) = f_p(i) + (\alpha_{N+k} + \beta_{N+k}) \cdot u_{N+k+1-i) mod N}$$

where k is between 0 and N−1.

In the same way, the respective contents of registers $(91_j)_{(j=1,N)}$, at instant (N+k)T, are samples $f_q(j)$ such that:

$$f_q(j) = f_q(j) + (\beta_{N+k} - \alpha_{N+k}) \cdot u_{N+k+1-j) mod N}$$

and where k is between 0 and N−1.

The contents of the 2N registers $(90_i)_{(i=1,N)}$ and $(91_j)_{(j=1,N)}$ are applied to the input of 2N registers $(95_i)_{(i=1,N)}$ and $(97_j)_{(j=1,N)}$ where the N coefficients $f_p(i)_{(i=1,N)}$ and $f_q(j)_{(j=1,N)}$ are multiplied by the constant $1/a(N+1)$. In fact, as $1/(N+1)$ is equal to a negative power of 2, it is not necessary to provide a multiplication circuit. At the output of the N registers $(95_i)_{(i=1,N)}$ or $(97_j)_{(j=1,N)}$, coefficients $F_p(i)_{(i=1,N)}$ and $F_q(j)_{(j=1,N)}$ are obtained which are the coefficients of the echo cancelling device 10 under the initial conditions. These 2N coefficients $F_p(i)$ and $F_q(j)$ are therefore applied to the input of the echo cancelling device 10 and are the initialization device outputs.

They are also samples of the pulse response of the echo.

The embodiments of FIGS. 1 and 3 have been made in the hypothesis of an echo cancelling device in baseband.

The initialization device is more particularly interesting for transmission systems affected by remote echoes, which is particularly frequent in satellite transmissions.

In fact, certain links and in particular satellite links bring about a very long delay. After initialization and more particularly in steady state, the values of the coefficients of any echo cancelling device known per se are theoretically equal to the samples of the pulse response of the echo returned into baseband. In this way, if this pulse response is constituted by two series of non-zero samples separated by a series of zero samples of which the number depends on the delay of the remote echo, there is every interest in determining this delay in order not to have to calculate, adapt and store in memory, coefficients whose value will oscillate around zero and which would introduce noise.

Let $r_p$ be the sequence of samples indicative of the pulse response of the echo and let us assume that, for p included between 1 and g, the samples are non-zero; that for p between g+1 and m, the samples are zero and that, for p between m+1 and 1, the samples are non-zero. In steady state, any echo cancelling device known per se would make an echo signal cancellation taking into account all the samples, even those which are zero. This introduces noise on the echo cancellation.

The present invention envisages using the pulse response made by the initialization device according to the invention for optimizing the processing made by the cancelling device itself.

Let us assume that the coefficients $C_k$ of the echo cancelling device are updated according to the gradient algorithm. It is known that the step of the algorithm is a function of the number of so-called coefficient samples to be processed and more precisely that this step is an inverse function of this number of samples. A number of samples taking into account the zero samples introduce noise and reduce performance of the cancelling device. In fact, the greater the step of the algorithm, the quicker is the convergence.

Thus, the initialization device according to the invention makes it possible in steady state to determine the pulse response of the echo and via a means to control updating, said means to order the cancelling device to effect updating only of the non-zero samples. To this end, the samples of the pulse response of value greater than or equal to a predetermined threshold should be defined as non-zero.

However, in such applications, it is necessary to select the initialization sequence in appropriate manner. In fact, the length N of the pseudo-random sequence $u_k$ chosen for initializing the cancelling device must be greater than the total length L of the sequence $r_p$ of samples indicative of the pulse response of the echo (including zero samples).

What is claimed is:

1. Initialization device for adaptative echo cancelling device, said adaptative echo cancelling device comprising a transversal filter with N coefficients and means for constantly updating said N coefficients after said initialization device has provided initial values of said N coefficients, said echo cancelling device being connected in shunt with an echo path between an emission line and a reception line, said initialization device having a first output connected to said emission line, N outputs connected to said echo cancelling device, a first input connected to said reception line and a second input connected to a pseudo random generator providing a sequence of N binary samples $u_1 \ldots u_k, \ldots u_n$, said initialization device comprising:

first converting means connected between said second input and said first output for deriving a sample $e_k$ from every binary sample $u_k$ by the relation:

$$e_k = 2u_k - 1$$

a shift register, connected to the output of said first converting means, and comprising N cells $$A(1), \ldots A(M), \ldots A(N)$$

to store $$e_k, \ldots, e_{(N-M+k+1) \text{modulo } N}, \ldots, e_{k+1}$$

every cell being provided with one output, a set of N second converting means connected to said outputs of said cells, for deriving a sample $u_{(N-M+k+1) \text{ modulo } N}$ from every sample $e_{(N-M+k+1) \text{ modulo } N}$ stored in every said cell $A(M)$, by the relation:

$$u_{(N-M+k+1) \text{ modulo } N} = (e_{(N-M+k+1) \text{ modulo } N} + 1)/2$$

a set of N multipliers, ever multiplier having one input connected to said reception line, and another input connected to an output of one of said N second converting means, a set of N addition circuits, every addition circuit having a first input connected to an output of one of said N multipliers, a set of N registers, every register having an input connected an output of one of said N addition circuits, and an output connected to another input of said one of said N addition circuits, and to one of said N outputs of said initialization device.

2. Initialization device for adaptative echo cancelling device, said adaptive echo cancelling device comprising a transversal filter with N coefficients and means for constantly updating said N coefficients after said initialization device has provided initial values of said N coefficients, said echo cancelling device being connected in shunt with an echo path between a modulator and a reception line, said modulator provided with an output connected to an emission line and two inputs, said reception line being connected to an input of a demodulator, said demodulator provided with two outputs, said initialization device having two first outputs connected to said two inputs of said modulator, 2N outputs connected to said echo cancelling device, two first inputs connected to said demodulator outputs and a second input connected to a pseudo random generator providing a sequence of N binary samples $u_1, \ldots, u_k, \ldots u_N$, said initialization device comprising:

first converting means connected between said second input and said first outputs for deriving two samples $a_k$ and $b_k$ from every binary sample $u_k$ by the relation:

$$a_k = b_k = 2u_k - 1,$$

said first converting means having a first output and a second output, a first shift register, connected to the first output of said first converting means, and comprising N first cells $$AP(1), \ldots, AP(M), \ldots, AP(N)$$

to store $$a_k, \ldots, a_{(N-M+k+1) modulo\ N}, \ldots, a_{k+1}$$

every first cell being provided with one output,
a second shift register, connected to said second output of said first converting means, and comprising N second cells $$AQ(1), \ldots, AQ(M), \ldots, AQ(N)$$

to store $$b_k, \ldots, b_{(N-M+k+1) modulo\ N}, \ldots, b_{k+1}$$

every second cell being provided with one output, p1
a set of N second converting means, connected to said outputs of said N first cells, for deriving a sample $u_{(N-M+k+1)\ modulo\ N}$ from every sample $a_{(N-M+k+1)\ modulo\ N}$ stored in every said first cell AP(M) by the relation:

$$u_{(N-M+k+1) modulo\ N} = (a_{(N-M+k+1) modulo\ N} + 1)/2$$

a set of N third converting means, connected to said outputs of said N second cells, for deriving a sample $u_{(N-M+k+1)\ modulo\ N}$ from every sample $b_{(N-M+k+1)\ modulo\ N}$ stored in every said second AQ(M) by the relation:

$$u_{(N-M+k+1) modulo\ N} = (a_{(N-M+k+1) modulo\ N} + 1)/2$$

first and second adders connected to said two demodulator outputs for providing a sum and a difference, respectively, of said two demodulator outputs' quantities,
a set of N first multipliers, every multiplier having one input connected to said first adder, and another input connected to an output of a different respective one of said N second converting means,
a set of N second multipliers, every multiplier having one input connected to said second adder, and another input connected to an output of a different respective one of said N third converting means,
a set of 2N addition circuits, each said addition circuit having a first input and a second input, each first input of said 2N addition circuits connected to an output of a different one of said N first and N second multipliers,
a set of 2N registers, every register having an input connected to an output of a different one of said 2N addition circuits, and an output connected to the second input of each respective addition circuit and to the respective one of said 2N outputs of said initialization device.

* * * * *